US012585835B2

(12) United States Patent
Kuravangi-Thammaiah et al.

(10) Patent No.: US 12,585,835 B2
(45) Date of Patent: Mar. 24, 2026

(54) SYSTEMS AND METHODS FOR NETWORK-INITIATED MODIFICATION OF ACCESS FOR LOST OR STOLEN DEVICES

(71) Applicant: Verizon Patent and Licensing Inc., Basking Ridge, NJ (US)

(72) Inventors: Shanthala Kuravangi-Thammaiah, Keller, TX (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 18/345,553

(22) Filed: Jun. 30, 2023

(65) Prior Publication Data

US 2025/0005211 A1 Jan. 2, 2025

(51) Int. Cl.
| | |
|---|---|
| *H04W 12/126* | (2021.01) |
| *G06F 21/53* | (2013.01) |
| *G06F 21/88* | (2013.01) |

(52) U.S. Cl.
CPC .............. *G06F 21/88* (2013.01); *G06F 21/53* (2013.01); *H04W 12/126* (2021.01)

(58) Field of Classification Search
CPC combination set(s) only.
See application file for complete search history.

(56) References Cited

U.S. PATENT DOCUMENTS

| | | | | |
|---|---|---|---|---|
| 8,483,663 B1 * | 7/2013 | Jones | ............... | H04M 1/72463 |
| | | | | 455/418 |
| 9,668,140 B2 * | 5/2017 | Enright | ................ | H04W 12/00 |

| | | | | |
|---|---|---|---|---|
| 10,749,867 B1 * | 8/2020 | Litani | ................. | H04L 63/0876 |
| 2014/0273968 A1 * | 9/2014 | Agarwal | .............. | H04W 12/06 |
| | | | | 455/411 |
| 2015/0189510 A1 * | 7/2015 | Enright | ................ | H04W 12/06 |
| | | | | 455/411 |

(Continued)

FOREIGN PATENT DOCUMENTS

| | | | | |
|---|---|---|---|---|
| KR | 102148291 B1 * | 8/2020 | .............. | H04W 8/22 |
| WO | WO-2017127019 A1 * | 7/2017 | .......... | H04W 12/126 |

OTHER PUBLICATIONS

"Mark a device as lost in Find My on iPhone", obtained online from <https://support.apple.com/guide/iphone/mark-a-device-as-lost-iph7cc193cfc/ios>, retrieved on Jun. 28, 2025 (Year: 2019).*

*Primary Examiner* — Zhimei Zhu

(57) ABSTRACT

A system described herein may receive a first indication that a particular User Equipment ("UE") has been reported as lost or stolen. The first indication may be received via an interface with an Equipment Information Repository ("EIR"). The system may output, to an access function (e.g., an Access and Mobility Management Function ("AMF")) of a network to which the UE is connected, a second indication that the UE has been reported as lost or stolen. The access function of the network may modify access of the particular UE to the network based on the indication that the particular UE has been reported as lost or stolen, and/or may output, to the UE, a third indication that the UE has been reported as lost or stolen. The UE may perform further security-related measures, such as disabling one or more applications, performing a factory reset, or entering a restricted mode.

20 Claims, 7 Drawing Sheets

(56) References Cited

U.S. PATENT DOCUMENTS

| | | | |
|---|---|---|---|
| 2015/0327073 A1* | 11/2015 | Rommer ............... | H04L 63/101 |
| | | | 455/410 |
| 2018/0098264 A1* | 4/2018 | Zait ......................... | H04W 8/02 |
| 2021/0153157 A1* | 5/2021 | Jeong ...................... | H04W 8/20 |

\* cited by examiner

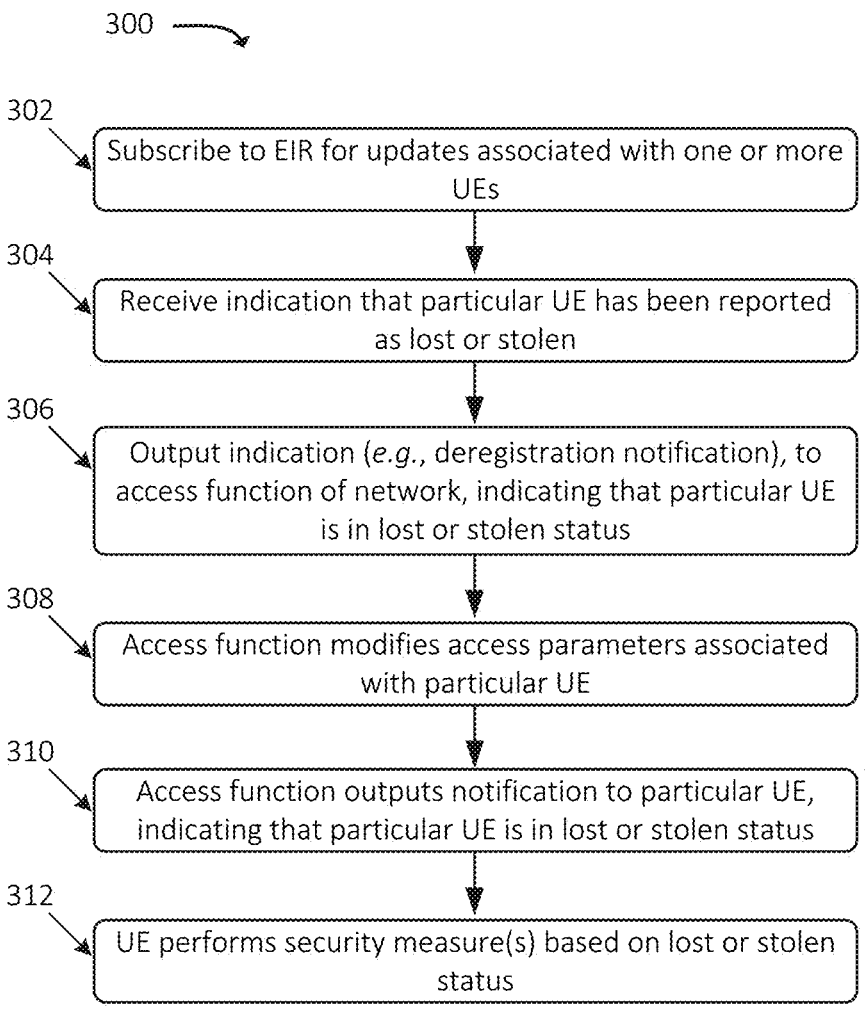

300

302
Subscribe to EIR for updates associated with one or more UEs

304
Receive indication that particular UE has been reported as lost or stolen

306
Output indication (*e.g.*, deregistration notification), to access function of network, indicating that particular UE is in lost or stolen status 308
Access function modifies access parameters associated with particular UE 310
Access function outputs notification to particular UE, indicating that particular UE is in lost or stolen status 312
UE performs security measure(s) based on lost or stolen status

FIG. 3

SYSTEMS AND METHODS FOR NETWORK-INITIATED MODIFICATION OF ACCESS FOR LOST OR STOLEN DEVICES

BACKGROUND

Wireless networks provide wireless connectivity to User Equipment ("UEs"), such as mobile telephones, tablets, Internet of Things ("IoT") devices, Machine-to-Machine ("M2M") devices, or the like. UEs may maintain sensitive information or may be used to access sensitive applications or websites (e.g., applications or websites that maintain or expose personal identification information, financial information, medical information, etc.). UEs that are lost or stolen may be subject to malicious use in which an unauthorized user of a UE may use the UE to gain access to sensitive information of the owner of the UE, such as by using passwords stored on the UE to access sensitive applications or websites.

BRIEF DESCRIPTION OF THE DRAWINGS

FIG. 3 illustrates an example process for a network-initiated lost or stolen mode of a particular UE, in accordance with some embodiments;

DETAILED DESCRIPTION OF EXAMPLE EMBODIMENTS

The following detailed description refers to the accompanying drawings. The same reference numbers in different drawings may identify the same or similar elements.

UEs, such as mobile phones, tablets, etc. may maintain sensitive information or may be used to access sensitive applications or websites (e.g., applications or websites that maintain or expose personal identification information, financial information, medical information, etc.). UEs that are lost or stolen may be subject to malicious use in which an unauthorized user of a UE may use the UE to gain access to sensitive information of the owner of the UE, such as by using passwords stored on the UE to access sensitive applications or websites. Further, UEs that are lost or stolen may be used to access a wireless network in an unauthorized manner, such as by utilizing excessive amounts of wireless data, which may incur charges or otherwise negatively impact the owners of such UEs. Embodiments described herein provide for techniques in which a UE may be reported as lost or stolen to a wireless network (e.g., a wireless network that provides wireless access to the UE), and the network may disallow or otherwise modify access to the network by the UE. Further, in accordance with some embodiments, the network may notify the UE that the UE has been reported as lost or stolen, and the UE may automatically take further measures to protect the owner of the UE, such as by entering a "lockdown" or "safe" mode, disabling one or more applications, triggering a factory reset, and/or other suitable operations.

Figure 1:
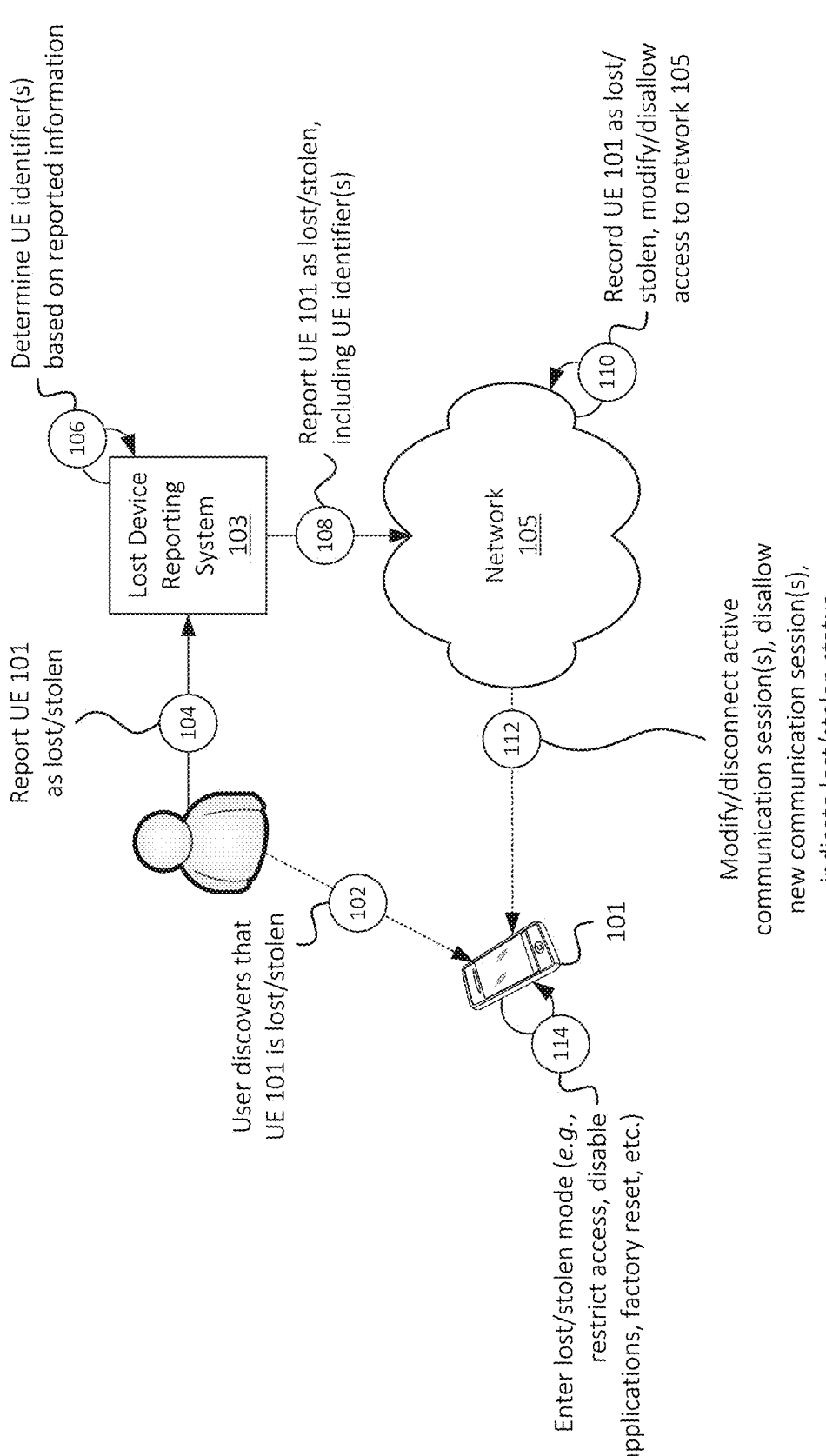
FIG. 1 illustrates an example overview of one or more embodiments described herein.

FIG. 1 illustrates an overview of some embodiments. As shown, a user may discover (at 102) that a particular UE 101 is lost or stolen. The user may be, for example, an owner of UE 101, an administrator of an organization or other entity that distributes or manages UE 101 and/or other UEs, or some other individual. While the examples provided herein discuss UEs that are "lost" or "stolen," similar concepts apply to UEs having any suitable status, for which network access restrictions should be implemented.

Based on discovering (at 102) that UE 101 is lost or stolen, the user may report (at 104) UE 101 as lost or stolen to Lost Device Reporting System ("LDRS") 103. LDRS 103 may be, may include, may be implemented by, may be communicatively coupled to, etc. an application server, a call center, or some other type of device, system, or facility. For example, LDRS 103 may include or may be associated with a customer service website that may be accessed via another UE (e.g., the user may use a device other than UE 101 that has been lost or stolen). As another example, LDRS 103 may include a call center or an interactive voice response ("IVR") system that the user may call to report UE 101 as lost or stolen.

LDRS 103 may receive (at 104) information about the user or UE 101, such as a name of the user, an account number of the user, a Mobile Directory Number ("MDN") of UE 101, and/or other suitable information. For example, LDRS 103 may provide a web form that may be filled out by the user, may provide voice prompts that may be verbally answered by the user, etc. Assuming that the user does not have access to UE 101, the user may not be able to provide UE identifiers such as an International Mobile Station Equipment Identity ("IMEI"), an International Mobile Subscriber Identity ("IMSI"), a Subscription Permanent Identifier ("SUPI"), a Globally Unique Temporary Identifier ("GUTI"), a Permanent Equipment Identifier ("PEI"), a Generic Public Subscription Identifier ("GPSI"), etc. Accordingly, LDRS 103 may determine (at 106) one or more of such identifiers based on the information provided (at 104) by the user. For example, LDRS 103 may include, may be associated with, may communicate with, etc. a provisioning system or other system of network 105 with which UE 101 is registered or provisioned. Such provisioning system may look up or otherwise determine the UE identifier(s) of UE 101 based on a registration or provisioning of UE 101 with network 105, in which user information (e.g., some or all of the information reported (at 104) by the user, such as the user's name, the MDN of UE 101, etc.) is associated with the UE identifier(s) of UE 101. In some embodiments, LDRS 103 may perform one or more suitable authentication or verification operations to verify that the user is authorized to report UE 101 as lost or stolen, such as by requesting a previously established password, requesting answers to previously established security questions, analyzing biometric information such as the user's voice, etc.

Assuming that LDRS 103 has identified (at 106) the UE identifier(s) of UE 101 and/or has verified that the user is authorized to report UE 101 as lost or stolen, LDRS 103 may report (at 108) to network 105 that UE 101 is lost or stolen. LDRS 103 may further provide (at 108) the UE identifier(s) of UE 101, such as the IMEI, IMSI, SUPI, GUTI, etc. Network 105 may accordingly record (at 110) UE 101 as lost or stolen. As discussed below, such recordation may include updating one or more user or UE information repositories, such as a Unified Data Management function ("UDM"), an Equipment Information Repository ("EIR"), a Home Subscriber Server ("HSS"), and/or other suitable element of network 105.

In accordance with some embodiments, network 105 may, based on receiving (at 108) the indication that UE 101 has been lost or stolen, restrict (at 112) network access for UE 101. For example, network 105 may disallow UE 101 from receiving access to network 105 (e.g., may reject connection requests or communication session requests), may close or de-establish existing communication sessions with UE 101, may modify Quality of Service ("QoS") information associated with UE 101 (e.g., may implement or modify throughput thresholds, latency thresholds, etc. for traffic associated with UE 101), and/or may perform other suitable measures.

In some embodiments, network 105 may indicate (at 112) to UE 101 that UE 101 has been reported as lost or stolen. For example, UE 101 may implement or execute an application programming interface ("API"), an application, or the like, that may receive one or more messages from network 105 indicating that UE 101 has been reported as lost or stolen. For example, network 105 may provide (at 112) the one or more messages via control plane signaling between network 105 and UE 101 (e.g., an Access and Mobility Management Function ("AMF"), a Mobility Management Entity ("MME"), or other suitable element of network 105 may provide the one or more messages via an N1 interface, Non-Access Stratum ("NAS") signaling, or the like).

In some embodiments, UE 101 may enter (at 114) a lost or stolen mode based on receiving the indication that UE 101 has been reported as lost or stolen. In the lost or stolen mode, an operating system, an API, an application, or some other element of UE 101 may perform one or more measures to mitigate the risk of unauthorized access to UE 101. For example, UE 101 may disable one or more applications (e.g., banking applications, medical applications, or other types of applications may be "sandboxed" or otherwise made unusable or inaccessible when in the lost or stolen mode), may enter a "lockdown" mode in which only basic functions such as emergency calls are available, may perform an automated backup and/or factory reset, etc. In this manner, network 105 may be able to initiate both network-implemented and UE-implemented security measures (e.g., modifying access to network 105, and/or entering a lost or stolen mode at UE 101), in accordance with some embodiments.

Figure 2:
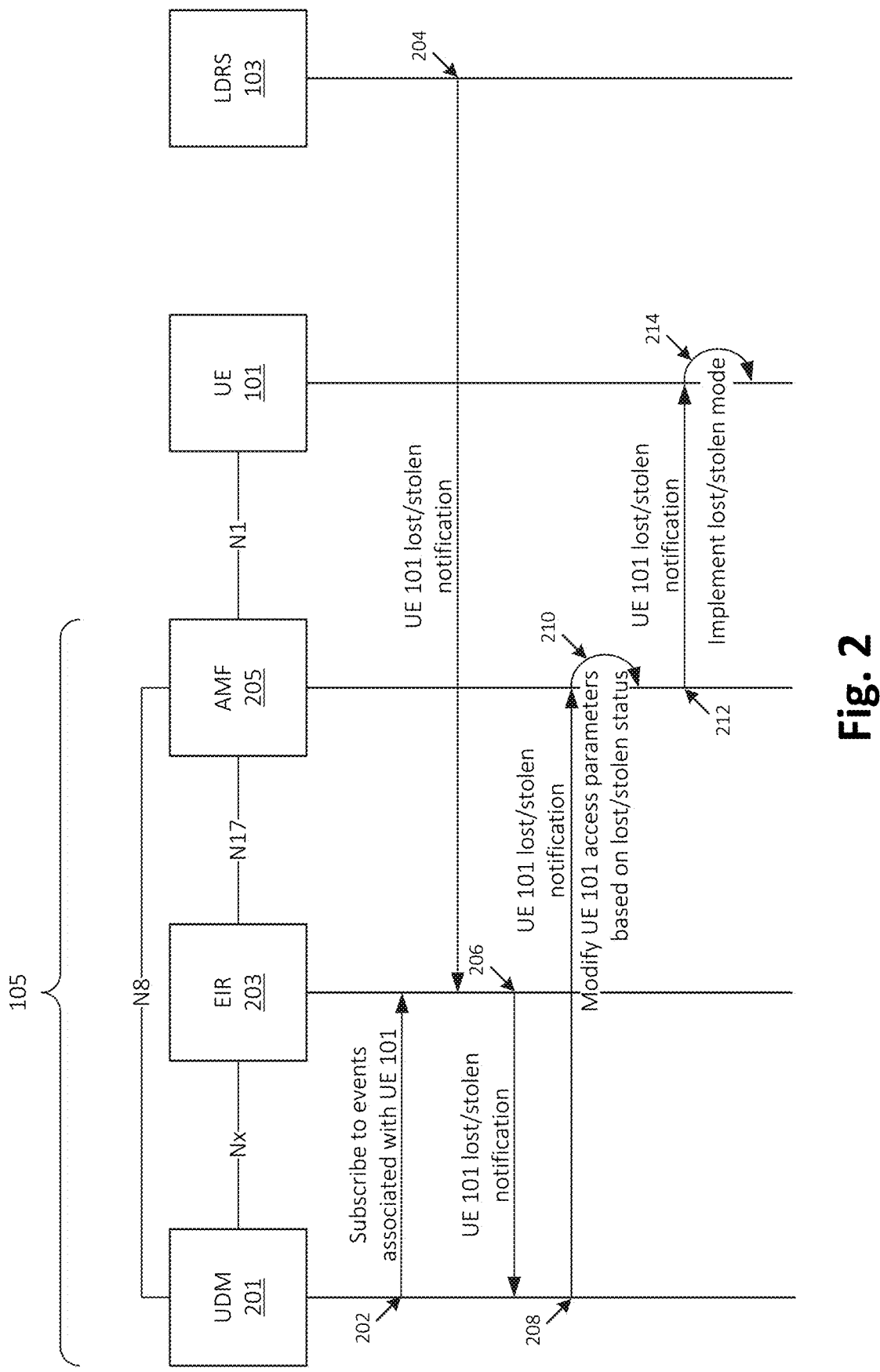
FIG. 2 illustrates example signaling between elements of a network to perform a network-initiated lost or stolen mode of a particular UE, in accordance with some embodiments.

FIG. 2 illustrates communications between UE 101, LDRS 103, and/or one or more elements of network 105 (e.g., UDM 201, EIR 203, and/or AMF 205), in accordance with some embodiments. By way of the communications shown in FIG. 2, network 105 may initiate a lost or stolen status with respect to UE 101. As discussed above, such lost or stolen status may include modifying network access parameters for UE 101 (e.g., removing the authority of UE 101 to access network 105, and/or restricting or reducing the access of UE 101 to network 105), and/or indicating the lost or stolen mode to UE 101, based on which UE 101 may implement one or more security measures.

As shown, UDM 201 may subscribe (at 202) to EIR 203 for events associated with UE 101 and/or one or more other UEs. For example, UDM 201 may provide, to EIR 203, an indication that UDM 201 should be notified of events, updates, or other information associated with UE 101, as determined by, provided to, received by, etc. EIR 203. UDM 201 may provide, for example, one or more identifiers of UE 101, such as an IMEI, an IMSI, an MDN, a SUPI, a GUTI, etc. UDM 201 and EIR 203 may communicate via a particular interface, referred to herein as an "Nx" interface, which may be provided between UDM 201 and EIR 203 in accordance with some embodiments. In some embodiments, UDM 201 and EIR 203 may communicate via one or more other communication pathways, such as one or more Service-Based Interfaces ("SBIs"), in embodiments where network 105 implements or includes a Service-Based Architecture ("SBA"). Such SBIs may include, for example, an Nudm interface associated with UDM 201, an Neir interface associated with EIR 203, etc.

UDM 201 may subscribe (at 202) to events associated with UE 101 based on, for example, a new registration or provisioning of UE 101, the addition of a lost or stolen service to an account associated with UE 101, and/or based on one or more other suitable triggering events or conditions. The occurrence of such triggering events or conditions may be indicated by a provisioning system of network 105 or some other suitable source. Although the examples herein are discussed in the context of a single UE 101, UDM 201 may, in practice, subscribe to events associated with multiple UEs 101 or groups of UEs 101.

At some point, LDRS 103 output (at 204) a lost or stolen notification to EIR 203, indicating that UE 101 has been identified as lost or stolen. For example, as discussed above, a user associated with UE 101 may have communicated with LDRS 103 and/or some other suitable device or system to indicate that UE 101 is lost or stolen. The user may have provided identifying information regarding the user or UE 101, based on which LDRS 103 may have identified one or more identifiers of UE 101, such as an MDN, an IMSI, a SUPI, etc. Additionally, or alternatively, LDRS 103 may provide (at 204) information about the user or UE 101 (e.g., a name of the user, an account number of the user, an MDN of UE 101, etc.), and another device or system (e.g., EIR 203 and/or UDM 201) may determine one or more identifiers of UE 101 (e.g., an IMEI, an IMSI, a SUPI, a GPSI, a PEI, etc.). In some embodiments, LDRS 103 and EIR 203 may communicate via an API, a Network Exposure Function ("NEF") of network 105, and/or via some other suitable device, system, or communication pathway. Although presented in the context of EIR 203 receiving (at 204) a lost or stolen notification from LDRS 103, concepts described herein may apply to any suitable type of status or information change associated with UE 101, such as UE 101 being added to a whitelist, a "gray" list, a block list, etc. Further EIR 203 may receive (at 204) such notification from some other suitable device or system in addition to or in lieu of LDRS 103.

Based on receiving (at 204) the lost or stolen notification associated with UE 101, and further based on the subscription (at 202) by UDM 201 for information (e.g., events, updates, etc.) regarding UE 101, EIR 203 may output (at 206) a lost or stolen notification to UDM 201. In this manner, UDM 201 may be notified in real time or near-real time that UE 101 has been reported as lost or stolen. In some embodiments, UDM 201 may maintain information that UE 101 has been reported as lost or stolen, such as by updating one or more UE information records, maintained by UDM 201, associated with UE 101. In some embodiments, UDM 201 may propagate the indication that UE 101 has been reported as lost or stolen to one or more other devices or systems. For example, in situations where network 105 includes or is communicatively coupled to a converged packet core architecture (e.g., in which elements of a Fifth Generation Core ("5GC") and elements of an Evolved Packet Core ("EPC") are implemented), UDM 201 may notify an HSS of the EPC or other suitable element of the EPC that UE 101 has been reported as lost or stolen.

Based on receiving the notification that UE 101 has been reported as lost or stolen, UDM 201 may output (at 208) an indication to AMF 205 that UE 101 has been reported as lost or stolen. For example, UDM 201 may output a deregistration message (e.g., an Nudm_UECM_DeregistrationNotification or some other suitable type of deregistration message or notification) to AMF 205. UDM 201 may communicate (at 208) with AMF 205 via an N8 interface or via some other suitable interface (e.g., an Nudm SBI, an Namf SBI, etc.) or communication pathway. The notification (e.g., the deregistration message or notification output at 208) may include a flag, indicator, reason, cause, code, etc. (referred to herein simply as "reason" for the sake of brevity) indicating that UE 101 has been marked as lost or stolen.

AMF 205 may modify (at 210) one or more access parameters of UE 101 based on receiving (at 208) the notification. For example, AMF 205 may determine, based on the deregistration message, that UE 101 should not be allowed to access network 105. As another example, AMF 205 may determine that UE 101 is authorized to access network 105 with particular parameters, such as a particular set of network slices, a particular set of QoS parameters (e.g., a reduced set of QoS parameters as opposed to when UE 101 is not lost or stolen, such as lower throughput or higher latency), a particular set of radio access technologies ("RATs") or frequency bands, etc.

Although discussed in the context of AMF 205 modifying the access parameters of UE 101, one or more other elements of network 105 may modify the access parameters of UE 101 based on the lost or stolen status of UE 101. For example, in some embodiments, AMF 205 may communicate with a Policy Control Function ("PCF"), a Policy Charging and Rules Function ("PCRF"), UDM 201, an HSS, or other suitable element of network 105 to determine the modified access parameters based on the lost or stolen status of UE 101. Additionally, or alternatively, UDM 201 may determine the modified access parameters of UE 101 (e.g., based on rules or policies provided by a Policy Control Function ("PCF"), a Policy Charging and Rules Function ("PCRF"), etc. In such situations, AMF 205 may request the modified access parameters from UDM 201 based on the lost or stolen reason indicated in the deregistration message (provided (at 208).

In some embodiments, AMF 205 may output (at 212) a message, such as a deregistration request message, to UE 101 based on receiving (at 208) the deregistration message. In some embodiments, AMF 205 may provide (at 212) the reason for the deregistration. For example, AMF 205 may be configured to provide the reason to UE 101 any time that AMF 205 receives a deregistration message, or may be configured to provide the reason to UE 101 specifically when AMF 205 receives a deregistration message with an indicated reason of UE 101 being lost or stolen.

In some embodiments, AMF 205 may perform one or more other operations pursuant to (e.g., after), or in conjunction with, providing (at 212) the message to UE 101. For example, AMF 205 may communicate with an Session Management Function ("SMF") of network 105 to remove, de-establish, modify, etc. one or more communication sessions between UE 101 and network 105. In this manner, AMF 205 may effectively disconnect UE 101 from network 105, and/or may initiate the modification of communication sessions between UE 101 and network 105 (e.g., where such modification may be associated with a reduced or restricted access of network 105 by UE 101).

UE 101 may further implement (at 214) a lost or stolen mode based on the indicated reason in the notification (at 212) from AMF 205. For example, based on the indicated reason, UE 101 may output a deregistration accept message to AMF 205, may initiate a "lockdown" or "safe" mode, may communicate with one or more application servers or other devices or systems to indicate that UE 101 is lost or stolen (e.g., in situations where UE 101 has continued but reduced access to network 105, or via some other network such as a WiFi network), may disable one or more applications executing at UE 101, may provide a system-level message to one or more applications executing at UE 101 indicating that UE 101 has been indicated as lost or stolen (e.g., via an API or other suitable communication pathway, where such applications may themselves implement a secure mode or perform other measures), and/or may perform other suitable operations.

While the example of FIG. 2 is described in the context of elements of a 5GC (e.g., UDM 201 and AMF 205), similar operations may be performed by elements of a different type of network, such as an EPC. For example, an HSS and MME of an EPC may perform similar operations as described above with respect to UDM 201 and AMF 205, respectively.

FIG. 3 illustrates an example process 300 for a network-initiated lost or stolen mode of a particular UE. In some embodiments, some or all of process 300 may be performed by UDM 201, AMF 205, and/or UE 101. In some embodiments, portions of process 300 may be performed by one or more other devices or systems, such as LDRS 103, EIR 203, an HSS, an MME, or some other suitable device or system.

As shown, process 300 may include subscribing (at 302) to EIR 203 for updates associated with one or more UEs, which may include example UE 101. For example, as discussed above, UDM 201 may communicate with EIR 203 via a particular interface between UDM 201 and EIR 203 (e.g., an Nx interface, as provided for in one or more embodiments), to indicate that UDM 201 should be notified regarding events, updates, etc. with respect to the one or more UEs. EIR 203 may include one or more devices or systems that receive updates, reports, etc. of the status of the one or more UEs. Such status information may include an indication of whether the UEs are lost or stolen, not lost and not stolen, and/or other suitable status information. That is, while the lost or stolen status is discussed above, EIR 203 may be used for other types of information pertaining to the one or more UEs.

Process 300 may further include receiving (at 304) an indication that a particular UE (e.g., UE 101) has been reported as lost or stolen. For example, EIR 203 may have received an indication (e.g., from LDRS 103 and/or one or more other devices or systems) that UE 101 has been reported as lost or stolen, and/or may otherwise determine that UE 101 is associated with a particular status (e.g., a lost or stolen status, or other suitable status based on which network access for UE 101 should be restricted or otherwise modified).

Process 300 may additionally include outputting (at 306) an indication, to an access function of network 105, indicating that the particular UE is in a lost or stolen status (or some other suitable status based on which network access should be restricted or modified). For example, UDM 201 may output a deregistration notification or some other type of suitable message to AMF 205 of network 105 (e.g., a home network with which UE 101 is registered, provisioned, etc.). The deregistration notification (or other suitable type of message) may include a reason, flag, etc. indicating that UE 101 is in the lost or stolen status (or other suitable status). The indication, output (at 306) may be part of a network-initiated UE deregistration procedure with respect to UE 101. As discussed above, in some embodiments, UDM 201 may output a notification to some other device or system, such as an HSS, which may forward or otherwise output a notification to another access function of network 105 (e.g., an MME), indicating that UE 101 is in the lost or stolen status.

Process 300 may also include modifying (at 308), by the access function of network 105, access parameters associated with the particular UE. For example, AMF 205 may output one or more messages to UE 101 indicating that UE 101 has been disallowed from accessing network 105, and/or that parameters of access to network 105 for UE 101 have been modified. Such modified parameters may include, for example, a particular set of network slices that UE 101 is authorized to access when UE 101 is in the lost or stolen mode, a particular set of RATs or frequency bands that UE 101 is authorized to access when UE 101 is in the lost or stolen mode, and/or other suitable parameters. In some embodiments, AMF 205 may notify or otherwise communicate with one or more other elements of network 105 to determine or to implement the modified access parameters. For example, AMF 205 may obtain the modified access parameters from UDM 201, a PCF, or some other suitable element. In some embodiments, AMF 205 may notify an SMF, a base station to which UE 101 is connected, and/or one or more other elements of network 105 of the modified access parameters. In some embodiments, in situations where UE 101 is connected to another network (e.g., is roaming), AMF 205 may notify an AMF or other suitable element of the other network that UE 101 is lost or stolen, and the other network may modify access of UE 101 based on such notification.

In some embodiments, the operations performed by AMF 205 based on receiving the deregistration message with the reason indicating that UE 101 is in the lost or stolen status may be different than operations performed by AMF 205 when receiving a deregistration with other reasons. For example, AMF 205 may provide reduced access (e.g., a particular set of network slices and/or QoS parameters that effectively provide reduced or restricted access to network 105) to UE 101 when receiving a deregistration notification with the lost or stolen reason, and may remove access for UE 101 when receiving a deregistration with a different reason or no reason. In some embodiments, AMF 205 may perform the same operations (e.g., removing access for UE 101) when receiving the deregistration message with the lost or stolen status reason as when receiving deregistration messages with other reasons.

Process 300 may further include outputting (at 310), by the access function, a notification to the particular UE, indicating that the particular UE is in the lost or stolen status. For example, AMF 205 may output a message via an N1 interface, via NAS signaling, via control plane messaging, etc. indicating that UE 101 is in the lost or stolen status. In some embodiments, AMF 205 may provide the notification as part of a deregistration request, or may provide the notification prior to or otherwise independent of a deregistration request.

Process 300 may additionally include performing (at 312), by UE 101, one or more security measures based on receiving the notification (e.g., from AMF 205) that UE 101 is in the lost or stolen status. For example, as discussed above, UE 101 may disable one or more applications, may enter a "lockdown" mode, etc. In some embodiments, based on receiving the notification, UE 101 may forgo attempting to connect to network 105. That is, since UE 101 has received a notification from network 105 that UE 101 is not authorized to access network 105, UE 101 may forgo attempting to connect to network 105, as such attempts would be denied.

In some embodiments, similar operations may be performed when UE 101 is no longer in the lost or stolen status. For example, a user of UE 101 may find or locate UE 101, and may indicate (e.g., to LDRS 103) that UE 101 has been found or is otherwise no longer lost or stolen. LDRS 103 may notify EIR 203, which may notify UDM 201 (e.g., based on the subscription by UDM 201 for status updates associated with UE 101). UDM 201 may maintain information indicating that UE 101 is no longer in the lost or stolen status.

The user may unlock UE 101 (e.g., may cause UE 101 to revert or otherwise no longer perform the security measures), such as by entering a passcode to UE 101, providing biometric authentication (e.g., a fingerprint, a facial scan, etc.), and/or otherwise indicating to UE 101 that UE 101 is no longer in the lost or stolen mode. Once UE 101 is no longer in the lost or stolen mode, UE 101 may attempt to connect to network 105. Upon such attempt, AMF 205 may communicate with UDM 201 and, since information maintained by UDM 201 indicates that UE 101 is not in the lost or stolen status (e.g., information maintained by UDM 201 does not indicate that UE 101 is in the lost or stolen status), AMF 205 may proceed with facilitating the requested connection between UE 101 and network 105.

Figure 4:
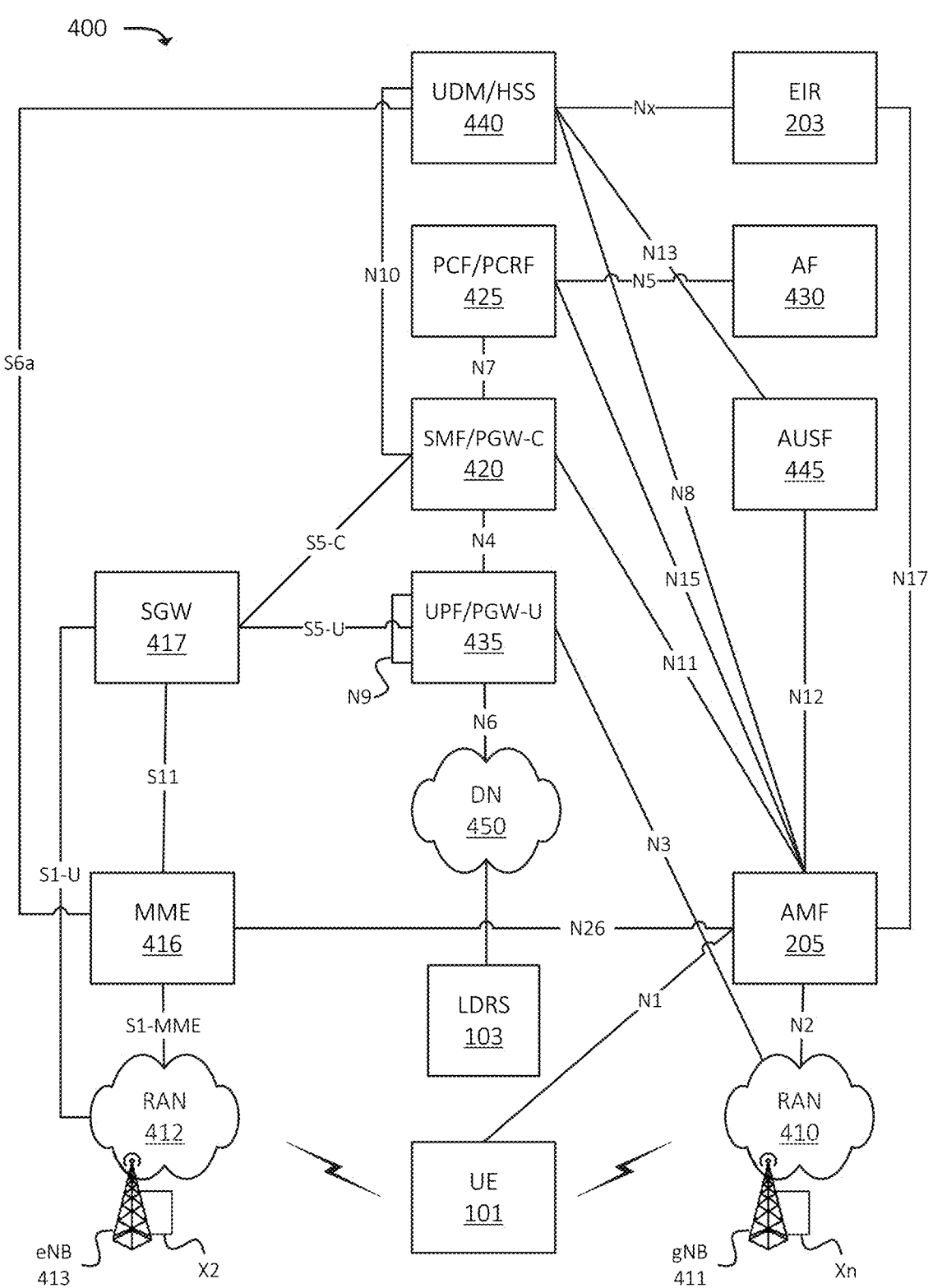
FIGS. 4 and 5 illustrate example environments in which one or more embodiments, described herein, may be implemented.

FIG. 4 illustrates an example environment 400, in which one or more embodiments may be implemented. In some embodiments, environment 400 may correspond to a Fifth Generation ("5G") network, and/or may include elements of a 5G network. In some embodiments, environment 400 may correspond to a 5G Non-Standalone ("NSA") architecture, in which a 5G RAT may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an EPC). In some embodiments, portions of environment 400 may represent or may include a 5GC. As shown, environment 400 may include UE 101, RAN 410 (which may include one or more Next Generation Node Bs ("gNBs") 411), RAN 412 (which may include one or more evolved Node Bs ("eNBs") 413), and various network functions such as AMF 205, MME 416, Serving Gateway ("SGW") 417, Session Management Function ("SMF")/Packet Data Network ("PDN") Gateway ("PGW")-Control plane function ("PGW-C") 420, Policy Control Function PCF/PCRF 425, Application Function ("AF") 430, User Plane Function ("UPF")/PGW-User plane function ("PGW-U") 435, UDM/HSS 440, and Authentication Server Function ("AUSF") 445. Environment 400 may also include one or more networks, such as Data Network ("DN") 450. Environment 400 may include one or more additional devices or systems communicatively coupled to one or more networks (e.g., DN 450), such as LDRS 103.

The example shown in FIG. 4 illustrates one instance of each network component or function (e.g., one instance of SMF/PGW-C 420, PCF/PCRF 425, UPF/PGW-U 435, UDM/HSS 440, and/or AUSF 445). In practice, environment 400 may include multiple instances of such components or functions. For example, in some embodiments, environment 400 may include multiple "slices" of a core network, where each slice includes a discrete and/or logical set of network functions (e.g., one slice may include a first instance of AMF 205, SMF/PGW-C 420, PCF/PCRF 425, and/or UPF/PGW-U 435, while another slice may include a second instance of AMF 205, SMF/PGW-C 420, PCF/PCRF 425, and/or UPF/PGW-U 435). The different slices may provide differentiated levels of service, such as service in accordance with different Quality of Service ("QoS") parameters.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. In some implementations, one or more devices of environment 400 may be physically integrated in, and/or may be physically attached to, one or more other devices of environment 400. Alternatively, or additionally, one or more of the devices of environment 400 may perform one or more network functions described as being performed by another one or more of the devices of environment 400.

Elements of environment 400 may interconnect with each other and/or other devices via wired connections, wireless connections, or a combination of wired and wireless connections. Examples of interfaces or communication pathways between the elements of environment 400, as shown in FIG. 4, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 4, such as SBIs including an Namf interface, an Nudm interface, an Npcf interface, an Nupf interface, an Nnef interface, an Nsmf interface, and/or one or more other SBIs. In some embodiments, environment 400 may be, may include, may be implemented by, and/or may be communicatively coupled to network 105.

UE 101 may include a computation and communication device, such as a wireless mobile communication device that is capable of communicating with RAN 410, RAN 412, and/or DN 450. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), a Fixed Wireless Access ("FWA") device, or another type of mobile computation and communication device. UE 101 may send traffic to and/or receive traffic (e.g., user plane traffic) from DN 450 via RAN 410, RAN 412, and/or UPF/PGW-U 435.

RAN 410 may be, or may include, a 5G RAN that includes one or more base stations (e.g., one or more gNBs 411), via which UE 101 may communicate with one or more other elements of environment 400. UE 101 may communicate with RAN 410 via an air interface (e.g., as provided by gNB 411). For instance, RAN 410 may receive traffic (e.g., user plane traffic such as voice call traffic, data traffic, messaging traffic, etc.) from UE 101 via the air interface, and may communicate the traffic to UPF/PGW-U 435 and/or one or more other devices or networks. Further, RAN 410 may receive signaling traffic, control plane traffic, etc. from UE 101 via the air interface, and may communicate such signaling traffic, control plane traffic, etc. to AMF 205 and/or one or more other devices or networks. Additionally, RAN 410 may receive traffic intended for UE 101 (e.g., from UPF/PGW-U 435, AMF 205, and/or one or more other devices or networks) and may communicate the traffic to UE 101 via the air interface.

RAN 412 may be, or may include, a LTE RAN that includes one or more base stations (e.g., one or more eNBs 413), via which UE 101 may communicate with one or more other elements of environment 400. UE 101 may communicate with RAN 412 via an air interface (e.g., as provided by eNB 413). For instance, RAN 412 may receive traffic (e.g., user plane traffic such as voice call traffic, data traffic, messaging traffic, signaling traffic, etc.) from UE 101 via the air interface, and may communicate the traffic to UPF/PGW-U 435 (e.g., via SGW 417) and/or one or more other devices or networks. Further, RAN 412 may receive signaling traffic, control plane traffic, etc. from UE 101 via the air interface, and may communicate such signaling traffic, control plane traffic, etc. to MME 416 and/or one or more other devices or networks. Additionally, RAN 412 may receive traffic intended for UE 101 (e.g., from UPF/PGW-U 435, MME 416, SGW 417, and/or one or more other devices or networks) and may communicate the traffic to UE 101 via the air interface.

AMF 205 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 410 and/or gNBs 411, and/or to perform other operations. In some embodiments, the 5G network may include multiple AMFs 205, which communicate with each other via the N14 interface (denoted in FIG. 4 by the line marked "N14" originating and terminating at AMF 205).

MME 416 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 412 and/or eNBs 413, and/or to perform other operations.

SGW 417 may include one or more devices, systems, VNFs, CNFs, etc., that aggregate traffic received from one or more eNBs 413 and send the aggregated traffic to an external network or device via UPF/PGW-U 435. Additionally, SGW 417 may aggregate traffic received from one or more UPF/PGW-Us 435 and may send the aggregated traffic to one or more eNBs 413. SGW 417 may operate as an anchor for the user plane during inter-eNB handovers and as an anchor for mobility between different telecommunication networks or RANs (e.g., RANs 410 and 412).

SMF/PGW-C 420 may include one or more devices, systems, VNFs, CNFs, etc., that gather, process, store, and/or provide information in a manner described herein. SMF/PGW-C 420 may, for example, facilitate the establishment of communication sessions on behalf of UE 101. In some embodiments, the establishment of communications sessions may be performed in accordance with one or more policies provided by PCF/PCRF 425.

PCF/PCRF 425 may include one or more devices, systems, VNFs, CNFs, etc., that aggregate information to and from the 5G network and/or other sources. PCF/PCRF 425 may receive information regarding policies and/or subscriptions from one or more sources, such as subscriber databases and/or from one or more users (such as, for example, an administrator associated with PCF/PCRF 425).

AF 430 may include one or more devices, systems, VNFs, CNFs, etc., that receive, store, and/or provide information that may be used in determining parameters (e.g., quality of service parameters, charging parameters, or the like) for certain applications.

UPF/PGW-U 435 may include one or more devices, systems, VNFs, CNFs, etc., that receive, store, and/or provide data (e.g., user plane data). For example, UPF/PGW-U 435 may receive user plane data (e.g., voice call traffic, data traffic, etc.), destined for UE 101, from DN 450, and may forward the user plane data toward UE 101 (e.g., via RAN 410, SMF/PGW-C 420, and/or one or more other devices). In some embodiments, multiple instances of UPF/PGW-U 435 may be deployed (e.g., in different geographical locations), and the delivery of content to UE 101 may be coordinated via the N9 interface (e.g., as denoted in FIG. 4 by the line marked "N9" originating and terminating at UPF/PGW-U 435). Similarly, UPF/PGW-U 435 may receive traffic from UE 101 (e.g., via RAN 410, RAN 412, SMF/PGW-C 420, and/or one or more other devices), and may forward the traffic toward DN 450. In some embodiments, UPF/PGW-U 435 may communicate (e.g., via the N4 interface) with SMF/PGW-C 420, regarding user plane data processed by UPF/PGW-U 435.

UDM/HSS 440 and AUSF 445 may include one or more devices, systems, VNFs, CNFs, etc., that manage, update, and/or store, in one or more memory devices associated with AUSF 445 and/or UDM/HSS 440, profile information associated with a subscriber. AUSF 445 and/or UDM/HSS 440 may perform authentication, authorization, and/or accounting operations associated with the subscriber and/or a communication session with UE 101.

DN 450 may include one or more wired and/or wireless networks. For example, DN 450 may include an Internet Protocol ("IP")-based PDN, a wide area network ("WAN") such as the Internet, a private enterprise network, and/or one or more other networks. UE 101 may communicate, through DN 450, with data servers, other UEs 101, and/or to other servers or applications that are coupled to DN 450. DN 450 may be connected to one or more other networks, such as a public switched telephone network ("PSTN"), a public land mobile network ("PLMN"), and/or another network. DN 450 may be connected to one or more devices, such as content providers, applications, web servers, and/or other devices, with which UE 101 may communicate.

Figure 5:
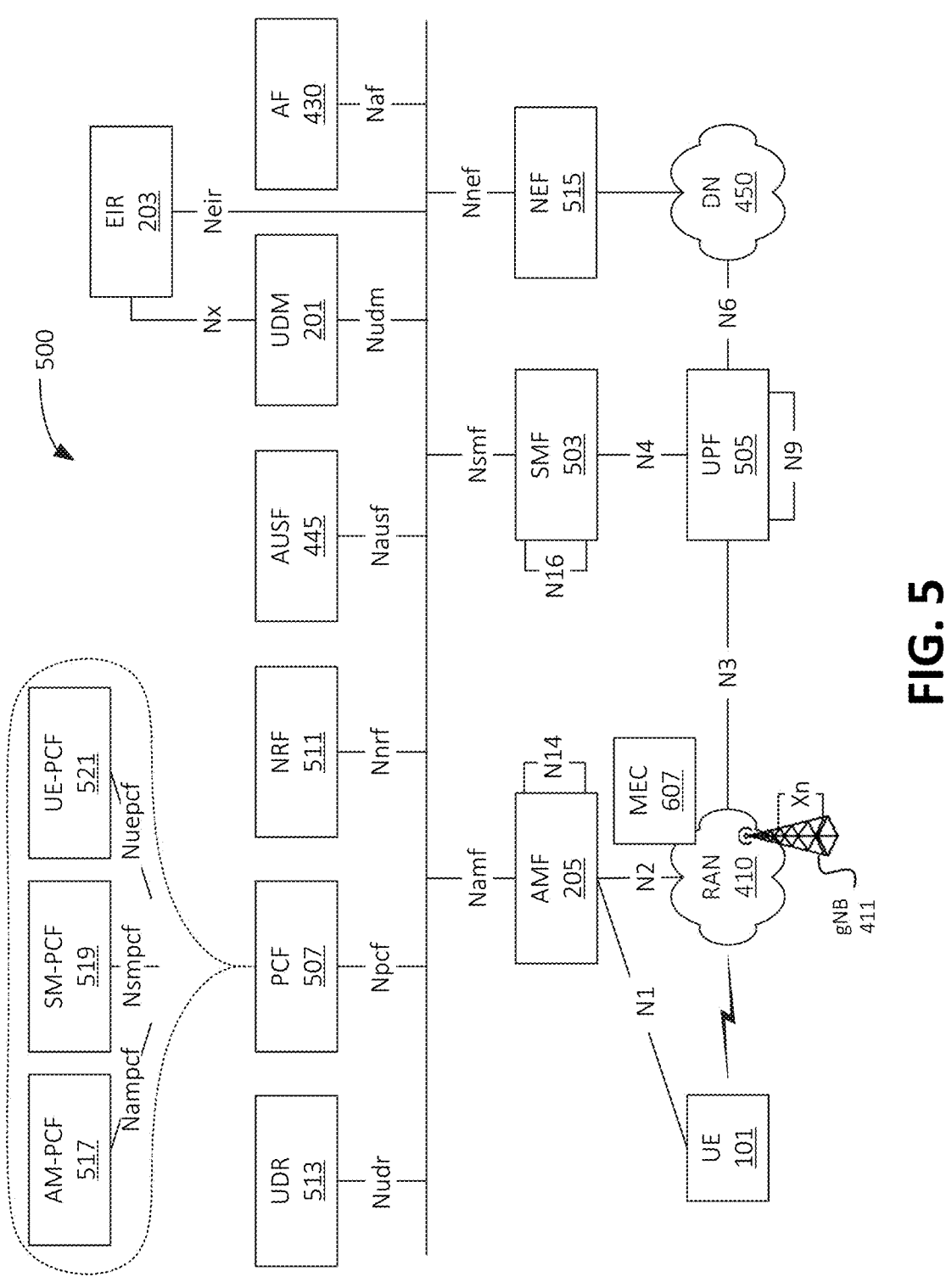

FIG. 5 illustrates another example environment 500, in which one or more embodiments may be implemented. In some embodiments, environment 500 may correspond to a 5G network, and/or may include elements of a 5G network. In some embodiments, environment 500 may correspond to a 5G SA architecture. In some embodiments, environment 500 may include a 5GC, in which 5GC network elements perform one or more operations described herein.

As shown, environment 500 may include UE 101, RAN 410 (which may include one or more gNBs 411 or other types of wireless network infrastructure) and various network functions, which may be implemented as VNFs, CNFs, etc. Such network functions may include AMF 205, SMF 503, UPF 505, PCF 507, UDM 201, AUSF 445, Network Repository Function ("NRF") 511, AF 430, Unified Data Repository ("UDR") 513, and NEF 515. Environment 500 may also include or may be communicatively coupled to one or more networks, such as Data Network DN 450.

The example shown in FIG. 5 illustrates one instance of each network component or function (e.g., one instance of SMF 503, UPF 505, PCF 507, UDM 201, AUSF 445, etc.). In practice, environment 500 may include multiple instances of such components or functions. For example, in some embodiments, environment 500 may include multiple "slices" of a core network, where each slice includes a discrete and/or logical set of network functions (e.g., one slice may include a first instance of SMF 503, PCF 507, UPF 505, etc., while another slice may include a second instance of SMF 503, PCF 507, UPF 505, etc.). Additionally, or alternatively, one or more of the network functions of environment 500 may implement multiple network slices. The different slices may provide differentiated levels of service, such as service in accordance with different QoS parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. In some implementations, one or more devices of environment 500 may be physically integrated in, and/or may be physically attached to, one or more other devices of environment 500. Alternatively, or additionally, one or more of the devices of environment 500 may perform one or more network functions described as being performed by another one or more of the devices of environment 500.

Elements of environment 500 may interconnect with each other and/or other devices via wired connections, wireless connections, or a combination of wired and wireless connections. Examples of interfaces or communication pathways between the elements of environment 500, as shown in FIG. 5, may include interfaces shown in FIG. 5 and/or one or more interfaces not explicitly shown in FIG. 5. These interfaces may include interfaces between specific network functions, such as an N1 interface, an N2 interface, an N3 interface, an N6 interface, an N9 interface, an N14 interface, an N16 interface, an N17 interface, and/or one or more other interfaces. As discussed above, EIR 203 and UDM 201 (and/or UDM/HSS 440) may communicate via an Nx interface, in accordance with some embodiments.

In some embodiments, one or more elements of environment 500 may communicate via an SBA, in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 205), an Nudm interface (e.g., indicating communications to be routed to UDM 201), an Npcf interface, an Nupf interface, an Nnef interface, an Nsmf interface, an Nnrf interface, an Nudr interface, an Naf interface, an Neir interface, and/or one or more other SBIs. In some embodiments, environment 500 may be, may include, may be implemented by, and/or may be communicatively coupled to network 105.

UPF 505 may include one or more devices, systems, VNFs, CNFs, etc., that receive, route, process, and/or forward traffic (e.g., user plane traffic). As discussed above, UPF 505 may communicate with UE 101 via one or more communication sessions, such as PDU sessions. Such PDU sessions may be associated with a particular network slice or other suitable QoS parameters, as noted above. UPF 505 may receive downlink user plane traffic (e.g., voice call traffic, data traffic, etc. destined for UE 101) from DN 450, and may forward the downlink user plane traffic toward UE 101 (e.g., via RAN 410). In some embodiments, multiple UPFs 505 may be deployed (e.g., in different geographical locations), and the delivery of content to UE 101 may be coordinated via the N9 interface. Similarly, UPF 505 may receive uplink traffic from UE 101 (e.g., via RAN 410), and may forward the traffic toward DN 450. In some embodiments, UPF 505 may implement, may be implemented by, may be communicatively coupled to, and/or may otherwise be associated with UPF/PGW-U 435. In some embodiments, UPF 505 may communicate (e.g., via the N4 interface) with SMF 503, regarding user plane data processed by UPF 505 (e.g., to provide analytics or reporting information, to receive policy and/or authorization information, etc.).

PCF 507 may include one or more devices, systems, VNFs, CNFs, etc., that aggregate, derive, generate, etc. policy information associated with the 5GC and/or UEs 101 that communicate via the 5GC and/or RAN 410. PCF 507 may receive information regarding policies and/or subscriptions from one or more sources, such as subscriber databases (e.g., UDM 201, UDR 513, etc.), and/or from one or more users such as, for example, an administrator associated with PCF 507. In some embodiments, the functionality of PCF 507 may be split into multiple network functions or subsystems, such as access and mobility PCF ("AM-PCF") 517, session management PCF ("SM-PCF") 519, UE PCF ("UE-PCF") 521, and so on. Such different "split" PCFs may be associated with respective SBIs (e.g., AM-PCF 517 may be associated with an Nampcf SBI, SM-PCF 519 may be associated with an Nsmpcf SBI, UE-PCF 521 may be associated with an Nuepcf SBI, and so on) via which other network functions may communicate with the split PCFs. The split PCFs may maintain information regarding policies associated with different devices, systems, and/or network functions.

NRF 511 may include one or more devices, systems, VNFs, CNFs, etc. that maintain routing and/or network topology information associated with the 5GC. For example, NRF 511 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 513 may include one or more devices, systems, VNFs, CNFs, etc. that provide user and/or subscriber information, based on which PCF 507 and/or other elements of environment 500 may determine access policies, QoS policies, charging policies, or the like. In some embodiments, UDR 513 may receive such information from UDM 201 and/or one or more other sources.

NEF 515 include one or more devices, systems, VNFs, CNFs, etc. that provide access to information, application programming interfaces ("APIs"), and/or other operations or mechanisms of the 5GC to devices or systems that are external to the 5GC. NEF 515 may maintain authorization and/or authentication information associated with such external devices or systems, such that NEF 515 is able to provide information, that is authorized to be provided, to the external devices or systems. Such information may be received from other network functions of the 5GC (e.g., as authorized by an administrator or other suitable entity associated with the 5GC), such as SMF 503, UPF 505, a charging function ("CHF") of the 5GC, and/or other suitable network function. NEF 515 may communicate with external devices or systems via DN 450 and/or other suitable communication pathways.

While environment 500 is described in the context of a 5GC, as noted above, environment 500 may, in some embodiments, include or implement one or more other types of core networks. For example, in some embodiments, environment 500 may be or may include a converged packet core, in which one or more elements may perform some or all of the functionality of one or more 5GC network functions and/or one or more EPC network functions. For example, in some embodiments, AMF 205 may include, may implement, may be implemented by, and/or may otherwise be associated with MME 416; SMF 503 may include, may implement, may be implemented by, and/or may otherwise be associated with SGW 417; PCF 507 may include, may implement, may be implemented by, and/or may otherwise be associated with a PCRF; NEF 515 may include, may implement, may be implemented by, and/or may otherwise be associated with a Service Capability Exposure Function ("SCEF"); and so on.

Figure 6:
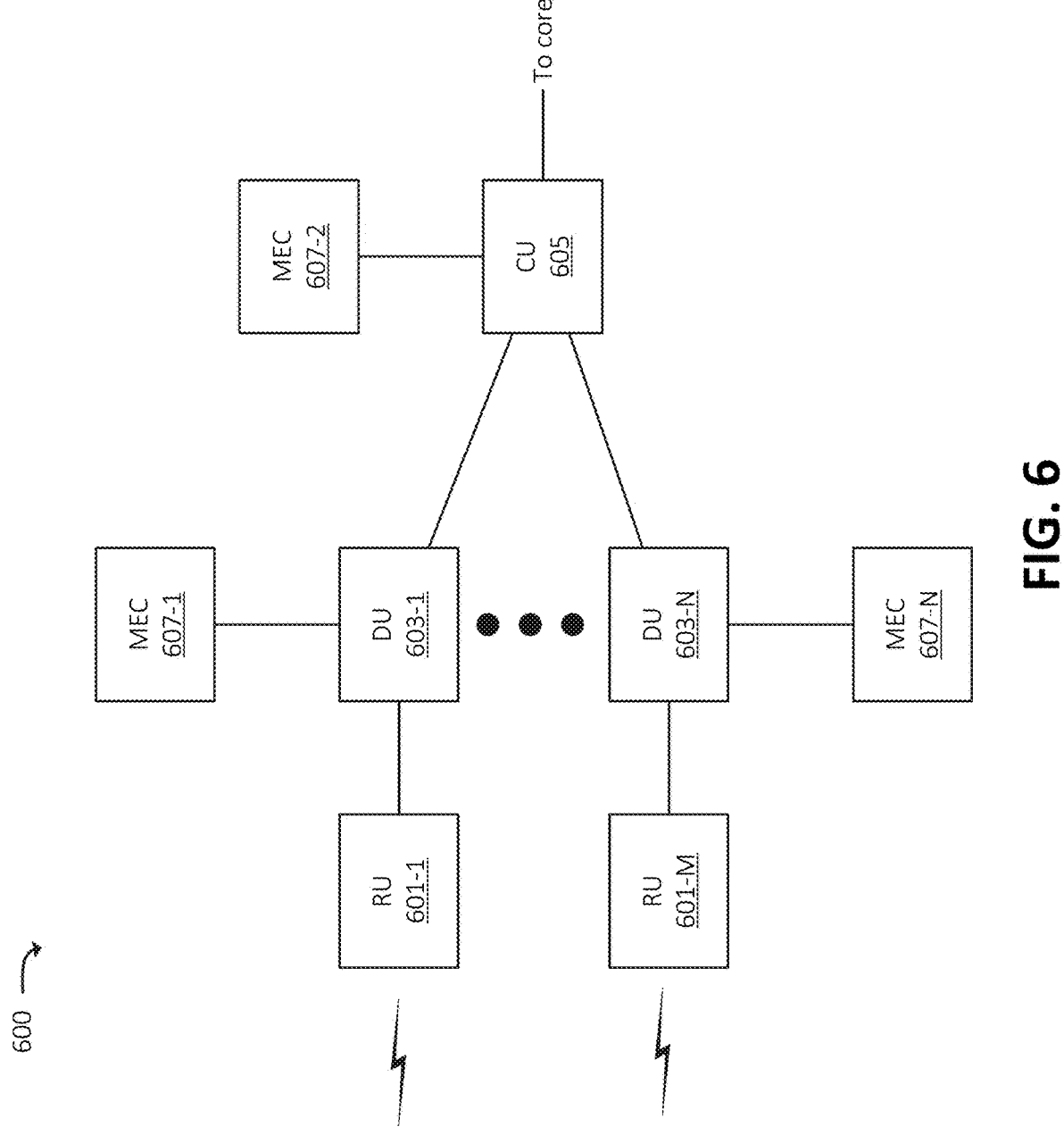
FIG. 6 illustrates an example arrangement of a radio access network ("RAN"), in accordance with some embodiments.

FIG. 6 illustrates an example RAN environment 600, which may be included in and/or implemented by one or more RANs (e.g., RAN 410 or some other RAN). In some embodiments, a particular RAN 410 may include one RAN environment 600. In some embodiments, a particular RAN 410 may include multiple RAN environments 600. In some embodiments, RAN environment 600 may correspond to a particular gNB 411 of RAN 410. In some embodiments, RAN environment 600 may correspond to multiple gNBs 411. In some embodiments, RAN environment 600 may correspond to one or more other types of base stations of one or more other types of RANs. As shown, RAN environment 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 205 and/or UPF 505). In the uplink direction (e.g., for traffic from UEs 101 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 101, and may determine which DU(s) 603 should receive the downlink traffic. DU 603 may include one or more devices that transmit traffic between a core network (e.g., via CU 605) and UE 101 (e.g., via a respective RU 601). DU 603 may, for example, receive traffic from RU 601 at a first layer (e.g., physical ("PHY") layer traffic, or lower PHY layer traffic), and may process/ aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 101.

RU 601 may include hardware circuitry (e.g., one or more RF transceivers, antennas, radios, and/or other suitable hardware) to communicate wirelessly (e.g., via an RF interface) with one or more UEs 101, one or more other DUs 603 (e.g., via RUs 601 associated with DUs 603), and/or any other suitable type of device. In the uplink direction, RU 601 may receive traffic from UE 101 and/or another DU 603 via the RF interface and may provide the traffic to DU 603. In the downlink direction, RU 601 may receive traffic from DU 603, and may provide the traffic to UE 101 and/or another DU 603.

One or more elements of RAN environment 600 may, in some embodiments, be communicatively coupled to one or more Multi-Access/Mobile Edge Computing ("MEC") devices, referred to sometimes herein simply as a "MECs," 607. For example, DU 603-1 may be communicatively coupled to MEC 607-1, DU 603-N may be communicatively coupled to MEC 607-N, CU 605 may be communicatively coupled to MEC 607-2, and so on. MECs 607 may include hardware resources (e.g., configurable or provisionable hardware resources) that may be configured to provide services and/or otherwise process traffic to and/or from UE 101, via a respective RU 601.

For example, DU 603-1 may route some traffic, from UE 101, to MEC 607-1 instead of to a core network via CU 605. MEC 607-1 may process the traffic, perform one or more computations based on the received traffic, and may provide traffic to UE 101 via RU 601-1. In some embodiments, MEC 607 may include, and/or may implement, some or all of the functionality described above with respect to UPF 505, AF 430, and/or one or more other devices, systems, VNFs, CNFs, etc. In this manner, ultra-low latency services may be provided to UE 101, as traffic does not need to traverse DU 603, CU 605, links between DU 603 and CU 605, and an intervening backhaul network between RAN environment 600 and the core network.

Figure 7:
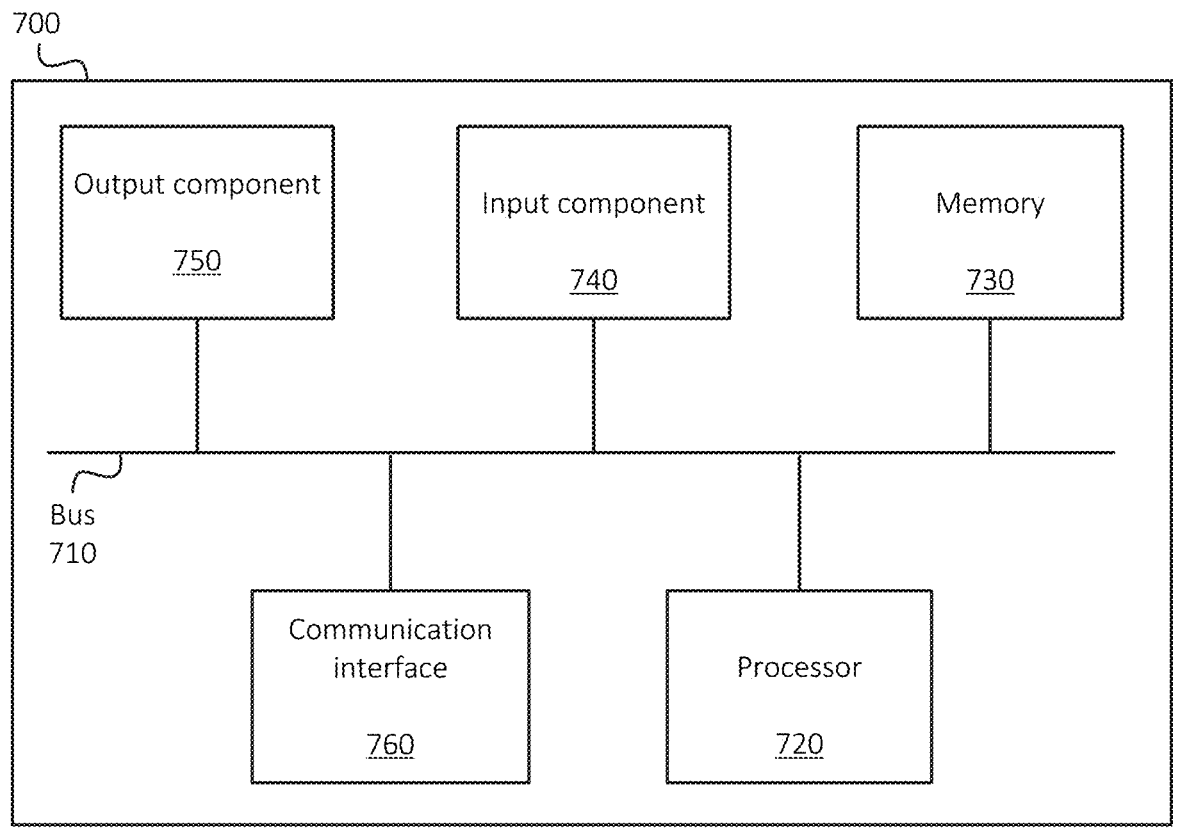
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions (e.g., processor-executable instructions). In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to input component 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing instructions, such as software instructions, processor-executable instructions, etc. stored in a computer-readable medium, such as memory 730. A computer-readable medium may be defined as a non-transitory memory device. A memory device may include space within a single physical memory device or spread across multiple physical memory devices. The instructions may be read into memory 730 from another computer-readable medium or from another device. The instructions stored in memory 730 may be processor-executable instructions that cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-3), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive an indication that a particular User Equipment ("UE") is associated with a lost or stolen device service;

subscribe, based on receiving the indication that the particular UE is associated with the lost or stolen device service, to an Equipment Information Repository ("EIR"), for updates associated with the particular UE, wherein the EIR:
receives a first indication that the particular UE has been reported as lost or stolen, and
outputs a second indication, that the particular UE has been reported as lost or stolen, based on the subscribing and further based on receiving the first indication;
receive, from the EIR, the second indication that the particular UE has been reported as lost or stolen; and
output, to an access function of a network to which the particular UE is connected and further based on receiving the second indication, a third indication that the particular UE has been reported as lost or stolen, wherein the access function of the network is configured to modify access of the particular UE to the network based on the third indication that the particular UE has been reported as lost or stolen, wherein outputting the third indication includes outputting a deregistration message to the access function via an N8 interface, wherein modifying the access of the particular UE includes:
selecting at least one of a particular network slice, a particular radio access technology ("RAT"), or a particular set of Quality of Service ("QoS") parameters, that the particular UE is authorized to access based on the third indication that the particular UE has been reported as lost or stolen, and
authorizing access of the particular UE to the network via the particular network slice, the particular RAT, or the particular set of QoS parameters.

2. The device of claim 1, wherein the access function of the network includes at least one of:
an Access and Mobility Management Function ("AMF"), or
a Mobility Management Entity ("MME").

3. The device of claim 1, wherein the device and the EIR are associated with a particular interface via which the EIR outputs the first indication to the device.

4. The device of claim 1, wherein outputting the third indication includes outputting a deregistration message, to the access function, that includes:
an identifier of the particular UE, and
a reason that indicates that the particular UE has been reported as lost or stolen, wherein the access function selects the particular network slice, the particular RAT, or the particular set of QoS parameters based on the reason included in the third indication.

5. The device of claim 4, wherein the access function of the network outputs a fourth indication to the particular UE, including the reason that indicates that the particular UE has been reported as lost or stolen, wherein the particular UE performs one or more security measures based on the reason included in the fourth indication.

6. The device of claim 1, wherein outputting the deregistration message includes outputting an Nudm_UECM_DeregistrationNotification to the access function.

7. The device of claim 1, wherein outputting the third indication to the access function of the network includes outputting the third indication by a UE information repository of the network.

8. A non-transitory computer-readable medium, storing a plurality of processor-executable instructions to:

receive an indication that a particular User Equipment ("UE") is associated with a lost or stolen device service;

subscribe, based on receiving the indication that the particular UE is associated with the lost or stolen device service, to an Equipment Information Repository ("EIR"), for updates associated with the particular UE, wherein the EIR:

receives a first indication that the particular UE has been reported as lost or stolen, and outputs a second indication, that the particular UE has been reported as lost or stolen, based on the subscribing and further based on receiving the first indication;

receive, from the EIR, the second indication that the particular UE has been reported as lost or stolen; and output, to an access function of a network to which the particular UE is connected and further based on receiving the second indication, a third indication that the particular UE has been reported as lost or stolen, wherein the access function of the network is configured to modify access of the particular UE to the network based on the third indication that the particular UE has been reported as lost or stolen, wherein outputting the third indication includes outputting a deregistration message to the access function via an N8 interface, wherein modifying the access of the particular UE includes:

selecting at least one of a particular network slice, a particular radio access technology ("RAT"), or a particular set of Quality of Service ("QoS") parameters, that the particular UE is authorized to access based on the third indication that the particular UE has been reported as lost or stolen, and authorizing access of the particular UE to the network via the particular network slice, the particular RAT, or the particular set of QoS parameters.

9. The non-transitory computer-readable medium of claim 8, wherein the access function of the network includes at least one of:

an Access and Mobility Management Function ("AMF"), or a Mobility Management Entity ("MME").

10. The non-transitory computer-readable medium of claim 8, wherein the device and the EIR are associated with a particular interface via which the EIR outputs the first indication to the device.

11. The non-transitory computer-readable medium of claim 8, wherein outputting the third indication includes outputting a deregistration message, to the access function, that includes:

an identifier of the particular UE, and:

a reason that indicates that the particular UE has been reported as lost or stolen, wherein the access function selects the particular network slice, the particular RAT, or the particular set of QoS parameters based on the reason included in the third indication.

12. The non-transitory computer-readable medium of claim 11, wherein the access function of the network outputs a fourth indication to the particular UE, including the reason that indicates that the particular UE has been reported as lost or stolen, wherein the particular UE performs one or more security measures based on the reason included in the fourth indication.

13. The non-transitory computer-readable medium of claim 8, wherein outputting the deregistration message includes outputting an Nudm_UECM_Deregistration Notification to the access function.

14. The non-transitory computer-readable medium of claim 8, wherein outputting the third indication to the access function of the network includes outputting the third indication by a UE information repository of the network.

15. A method, comprising:

receiving an indication that a particular User Equipment ("UE") is associated with a lost or stolen device service;

subscribing, based on receiving the indication that the particular UE is associated with the lost or stolen device service, to an Equipment Information Repository ("EIR"), for updates associated with the particular UE, wherein the EIR:

receives a first indication that the particular UE has been reported as lost or stolen, and outputs a second indication, that the particular UE has been reported as lost or stolen, based on the subscribing and further based on receiving the first indication;

receiving, from the EIR, the second indication that the particular UE has been reported as lost or stolen; and outputting, to an access function of a network to which the particular UE is connected and further based on receiving the second indication, a third indication that the particular UE has been reported as lost or stolen, wherein the access function of the network is configured to modify access of the particular UE to the network based on the third indication that the particular UE has been reported as lost or stolen, wherein outputting the third indication includes outputting a deregistration message to the access function via an N8 interface, wherein modifying the access of the particular UE includes:

selecting at least one of a particular network slice, a particular radio access technology ("RAT"), or a particular set of Quality of Service ("QoS") parameters, that the particular UE is authorized to access based on the third indication that the particular UE has been reported as lost or stolen, and authorizing access of the particular UE to the network via the particular network slice, the particular RAT, or the particular set of QoS parameters.

16. The method of claim 15, wherein the access function of the network includes at least one of:

an Access and Mobility Management Function ("AMF"), or a Mobility Management Entity ("MME").

17. The method of claim 15, wherein a device, that receives the first indication, and the EIR are associated with a particular interface via which the EIR outputs the first indication to the device.

18. The method of claim 15, wherein outputting the third indication includes outputting a deregistration message, to the access function, that includes:

an identifier of the particular UE, and a reason that indicates that the particular UE has been reported as lost or stolen, wherein the access function of the network outputs a fourth, to the particular UE, that includes the reason indicating that the particular UE has been reported as lost or stolen, wherein the particular UE performs one or more security measures based on the reason included in the fourth indication.

19. The method of claim 15, wherein outputting the deregistration message includes outputting an Nudm_UECM_DeregistrationNotification to the access function.

20. The method of claim 15, wherein outputting the third indication to the access function of the network includes outputting the third indication by a UE information repository of the network.

* * * * *